United States Patent [19]
Naudus et al.

[11] Patent Number: 6,130,880
[45] Date of Patent: Oct. 10, 2000

[54] METHOD AND APPARATUS FOR ADAPTIVE PRIORITIZATION OF MULTIPLE INFORMATION TYPES IN HIGHLY CONGESTED COMMUNICATION DEVICES

[75] Inventors: Stanley T. Naudus, Springfield, Va.; Chester Szczepucha, Grass Valley, Calif.; Guido M. Schuster, Des Plaines, Ill.

[73] Assignee: 3Com Corporation, Santa Clara, Calif.

[21] Appl. No.: 09/044,958

[22] Filed: Mar. 20, 1998

[51] Int. Cl.⁷ .............................. G01R 31/08; H04J 3/16; H04J 3/22
[52] U.S. Cl. ............................................ 370/235; 370/468
[58] Field of Search ..................................... 370/235, 237, 370/230, 231, 229, 400, 412, 401, 466, 468, 465, 477

[56] References Cited

U.S. PATENT DOCUMENTS

| | | | |
|---|---|---|---|
| 5,528,595 | 6/1996 | Walsh et al. | 370/85.13 |
| 5,568,525 | 10/1996 | De Nijs et al. | 375/356 |
| 5,577,105 | 11/1996 | Baum et al. | 379/93 |
| 5,726,640 | 3/1998 | Jones et al. | 340/825.22 |

OTHER PUBLICATIONS

Kozen, D., Minsky, Y., and Smith, B., "Efficient Algorithms for Optimal Video Transmission", Proceedings of IEEE Computer Society Conference, Mar. 30–Apr. 1, 1998, Snowbird, Utah, pp. 229 to 238.

*Primary Examiner*—Alpus H. Hsu
*Assistant Examiner*—Duc Ho
*Attorney, Agent, or Firm*—McDonnell Boehnen Hulbert & Berghoff; Stephen Lesavich

[57] ABSTRACT

A method and apparatus are used in a gateway to discard selected frames received with a selected encoded-information-type from a communication link with a larger bandwidth to avoid overflowing an internal delay variance removing queue used for protocol translation to a communication link with a smaller bandwidth. The discarded frames do not decrease the quality of translated information. A visual delay variance removing queue congestion indicator is included to indicate three levels of congestion in the delay variance removing queue for received frames. The method and apparatus are used in a multimedia gateway which is translating audio/video conferencing protocols (e.g., H.320, H.323/LAN H.323/PPP and H.324) received from a communication link with a large bandwidth and sent to a communication link with a smaller bandwidth.

19 Claims, 13 Drawing Sheets

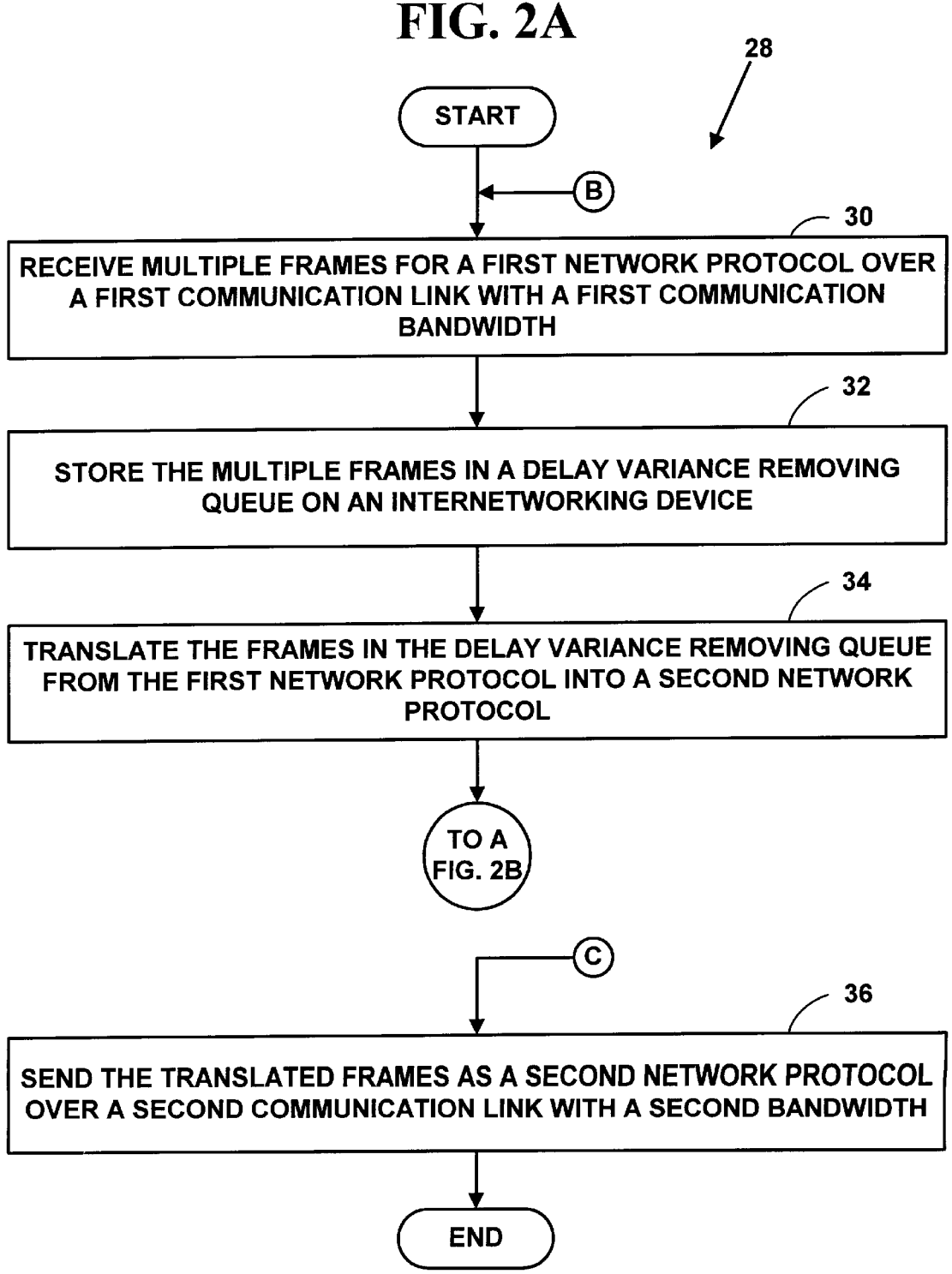

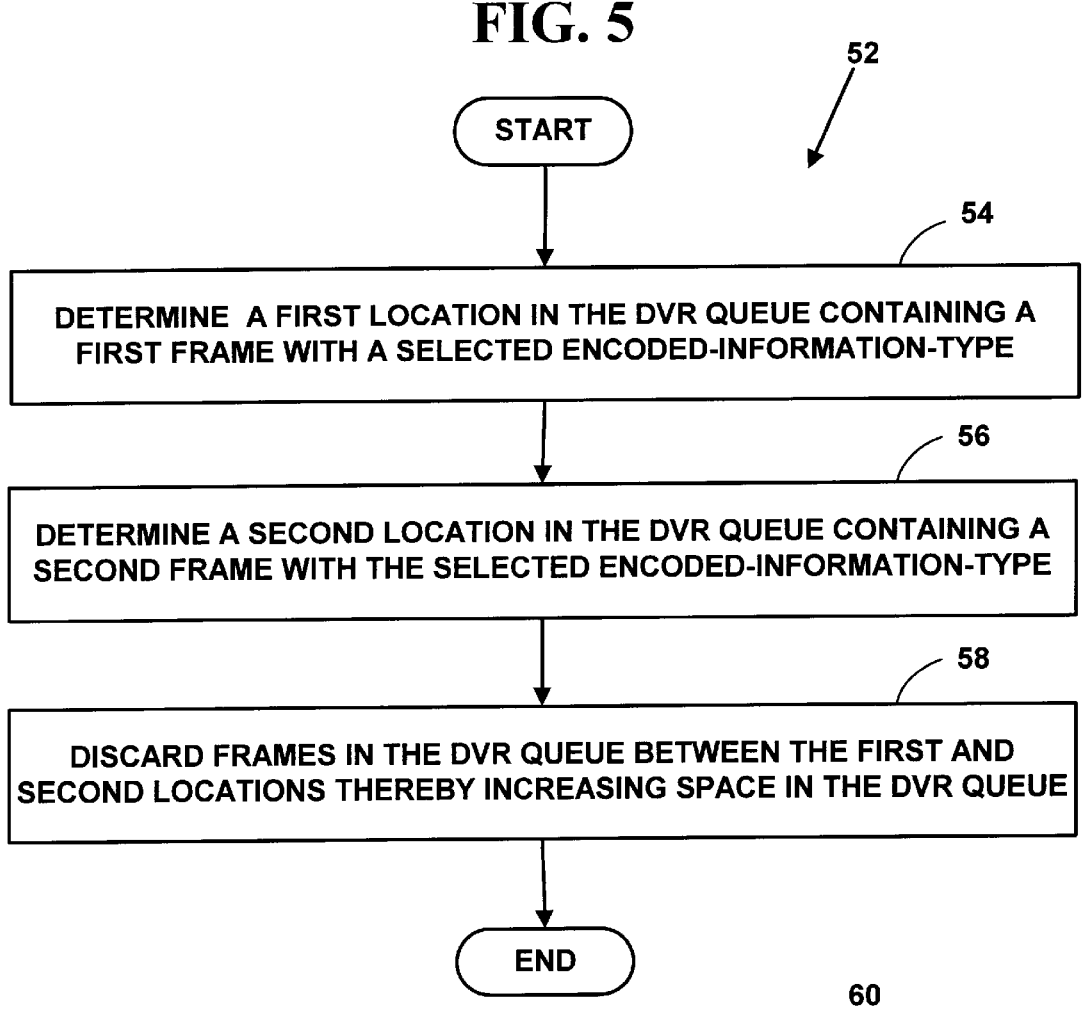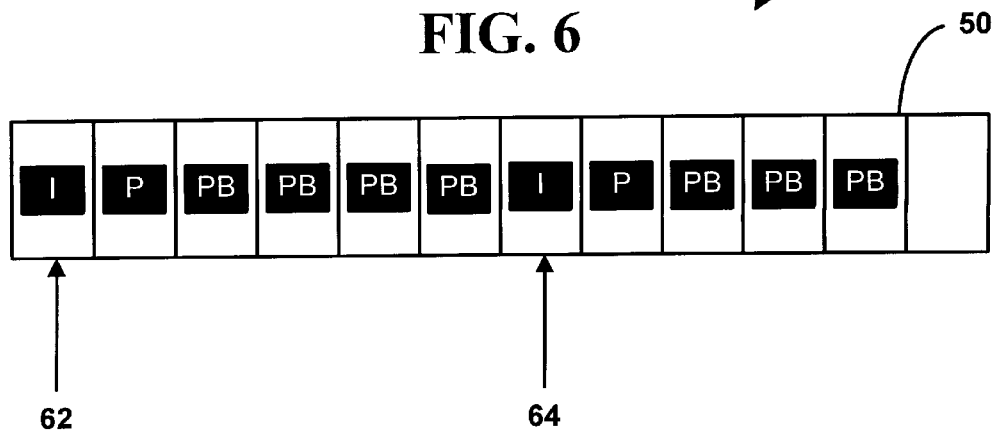

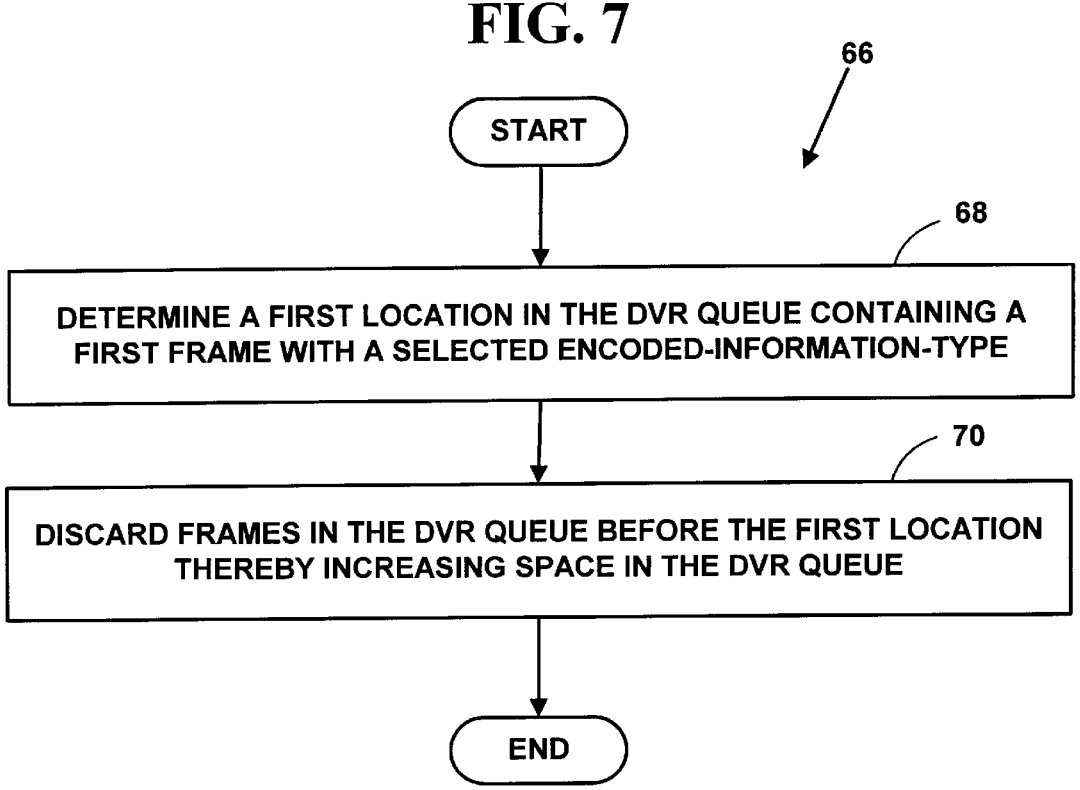
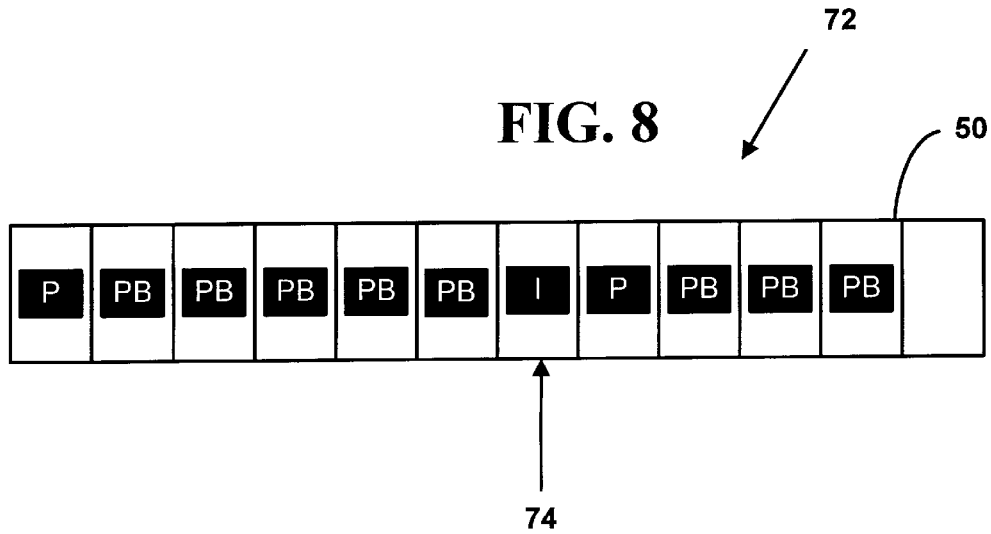

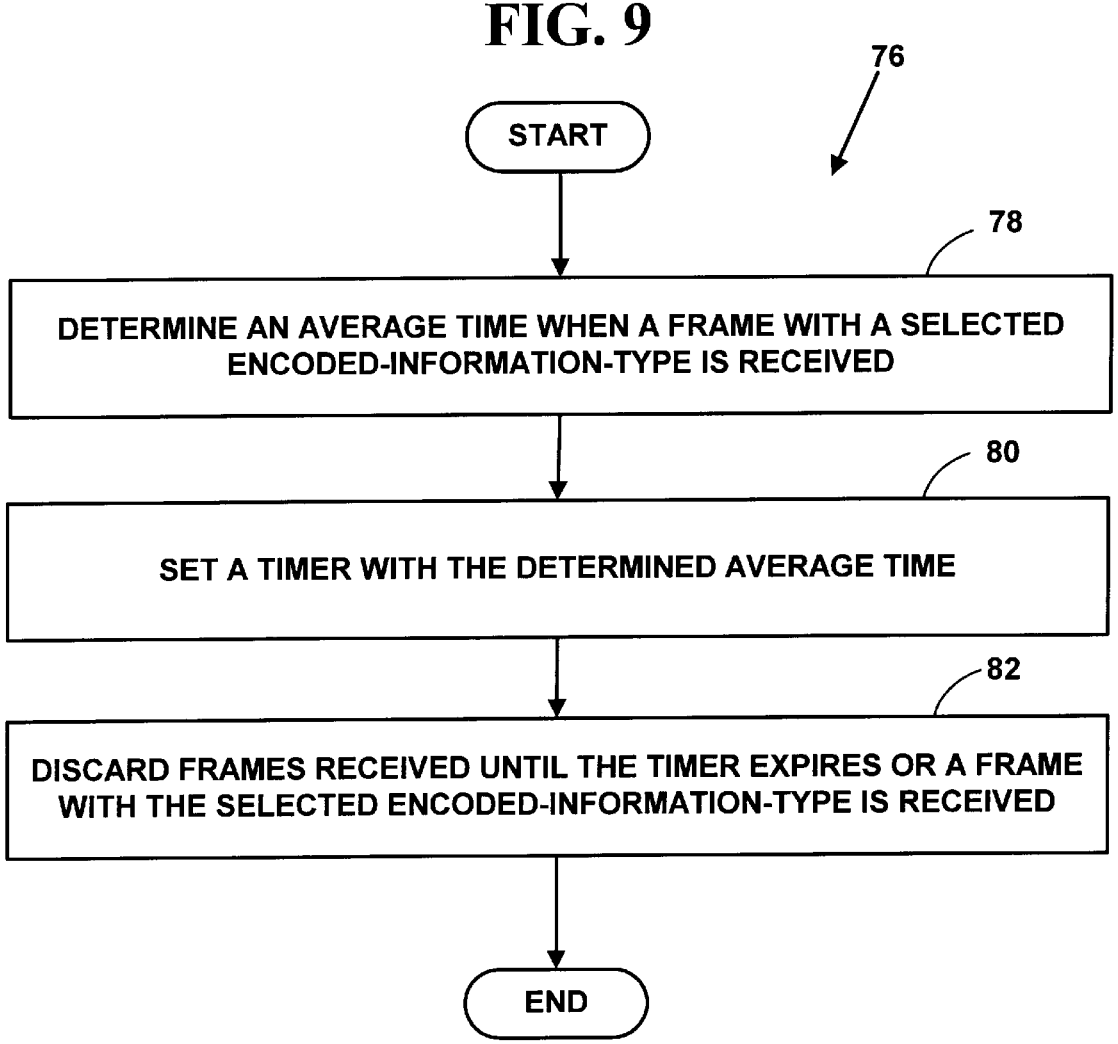
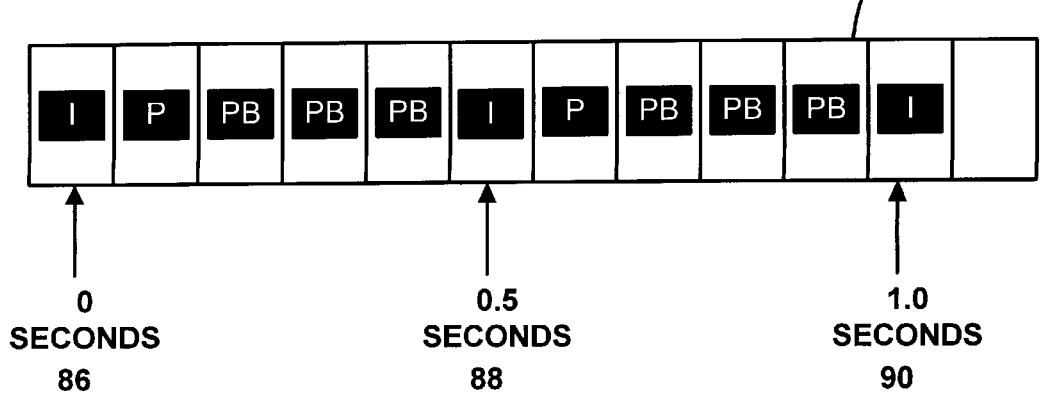

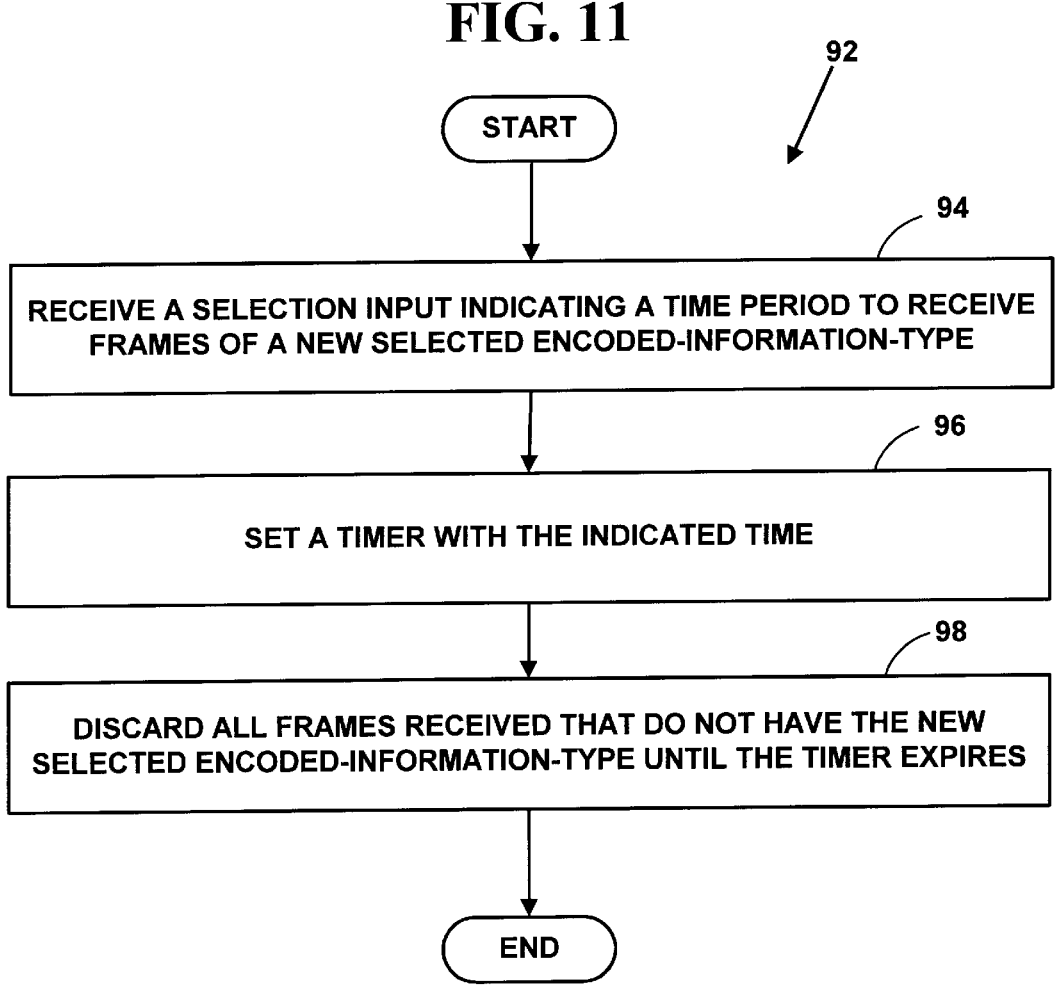

METHOD AND APPARATUS FOR ADAPTIVE PRIORITIZATION OF MULTIPLE INFORMATION TYPES IN HIGHLY CONGESTED COMMUNICATION DEVICES

FIELD OF INVENTION

The present invention relates to communication in computer networks. More specifically, it relates to adaptive prioritization of multiple information types in highly congested communication devices.

BACKGROUND OF THE INVENTION

As is known in the art, a variety of computing devices are often connected together to form a computer network. The computer network may be a Local Area Network ("LAN") that connects devices over a small geographical area, or a Wide Area Network ("WAN") that connects devices over a large geographical area. The computing devices include video cameras, CD-ROMs, microphones, televisions, computers, modems, cable modems and other devices that send high resolution images, graphical images, moving images, audio and data in addition to textual information. Different types of computer networks may be interconnected to each other to form larger computer networks (e.g., the Internet). The interconnections include LAN-LAN, LAN-WAN, WAN-WAN, LAN-WAN-LAN, and other network interconnections.

The computing devices transfer multimedia information (e.g., audio, video and data) between two or more computer networks. Transferring multimedia information between two computer networks may or may not require a reserved bit rate transmission capacity, and a reserved bandwidth possibly for the total duration of the transaction. For example, multimedia information for a ten second video clip with sound that is being sent between two points in a Ethernet LAN, requires a significant portion of a 10 Mega-bits-per-second ("Mbps") data transmission capacity available on the LAN for ten seconds to send the multimedia information.

Gateways connect computer networks using different network protocols operating at different transmission capacities. For example, a gateway may have network connections to serial data lines connected to one or more modems. The serial data lines may be used one at a time at a relatively low transmission speed (e.g., 14,400 bps, 28,800 bps, or 56,000 bps) or can be bundled into a group at a higher transmission speed. In contrast, the gateway may also have one or more LAN connections (e.g., Ethernet, Token Ring, or Fiber Distributed Data Interface ("FDDI")). The LAN connections are higher speed connections (e.g., 10 Mbps) and are shared among multiple devices.

The gateway translates information contained in a first protocol being used on a first network connection into a second protocol being used on second network connection, and visa-versa, without undue delay or loss of information. For example, a modem operating at 28,800 bps may be using the International Telecommunications Union-Telecommunication Standardization Sector ("ITU-T", formerly known as the CCITT) H.324 audio/video conferencing protocol and a LAN operating at 10 Mbps may be using the ITU-T H.323 audio/video conferencing protocol for a video conferencing connection. A gateway translates H.323 from the LAN into H.324 for use on the modem, and visa-versa, without undue delay or loss of information even though the LAN is transmitting information at 10 Mbps and the modem is transmitting information at 28,800 bps.

However, the gateway may also translate H.323 on a LAN to H.323 on a serial line using the Point-to-Point Protocol ("PPP"), H.323 on a LAN to H.320 on an Integrated Services Digital Network ("ISDN") line, or translate H.32x on a LAN or a serial line to H.32x on a LAN or a serial line. The gateway is also responsible for maintaining timing relationships and packet sequencing even though a first protocol may use timing relationships and a second protocol may not use timing relationships.

When gateways are used to translate multimedia information between two computer networks, logical multimedia channels are typically created with separate audio, video and data channels. The audio and video channels are typically allocated with predetermined, fixed maximum bandwidth. For example, on a modem connection a audio channel may have a bandwidth of 5,300 bps and a video channel may have a bandwidth of 23,500 bps for a multimedia bandwidth of 28,800 bps. A LAN connection may use audio and video channels with larger bandwidth allocations since the LAN is capable of transmitting information at a much larger overall multimedia bandwidth (e.g., 10 Mbps).

There are several problems associated with using gateways or other internetworking devices known in the art to interconnect computer networks operating at different transmission capacities. For example, the logical channels for larger bandwidth computer network connections (e.g., LAN connections) are often connected to logical channels for smaller bandwidth computer network connections (e.g., modem connections). The larger bandwidth connections have no way of determining they are connected to smaller bandwidth, and more constrained connections. This will cause a constant congestion problem on a gateway since the logical channels for the larger bandwidth network is constantly transmitting more information than can be accepted by the lower bandwidth network. In addition, the gateway must translate between two or more different protocols for the connections without undue delay or loss of information.

If data is sent along with the audio and video information on a multimedia connection, the congestion problems are further aggravated on the gateway. The gateway allocates a chunk of transmission bandwidth for a logical data channel. Since the data transmission is typically very bursty, the transmission bandwidth allocated for data channel is often wasted when no data is being sent. For example, the gateway may allocate a 5,000 bps logical data channel for each network connection using the data. For a modem with a bandwidth of 28,800 bps, this wastes about 17% of the available bandwidth on the modem. This is a significant waste of bandwidth on a smaller bandwidth network connection.

Another problem is that the gateway must maintain timing relationships and packet sequencing translating between certain protocols. The timing relationships and packet sequencing must be maintained even though a first protocol uses timing and a second protocol does not.

SUMMARY OF THE INVENTION

In accordance with a preferred embodiment of the present invention, the congestion problems for translating protocols are overcome. A method and apparatus for adaptively prioritizing between two or more encoded-information-types received over a communication link in multiple frames in an internetworking device (e.g., a gateway) is provided. The frames include multiple data bits. The method includes receiving multiple frames for a first network protocol over a first communication link having a first communication bandwidth. The multiple frames have one of multiple of encoded-information-types.

The received frames are stored in a delay variance removing queue in memory in the internetworking device. The delay variance removing queue allows the internetworking device to compensate for sequencing or timing relationships used in the first network protocol. The delay variance removing queue is also used as a buffer if it is not necessary to maintain timing relationships between two similar protocols. The frames from the delay variance removing queue are translated into a second network protocol. Periodically a test is completed to determine if a number of frames arriving on the first network connection exceeds a predetermined queue congestion threshold. The delay variance queue can be overflowed if the first communication link has a larger bandwidth than the second communication link. If the queue congestion threshold is exceeded, an encoded-information-type encoded in a frame is selected to store in the delay variance removing queue. Received frames are discarded that do have the selected encoded-information-type until enough frames have been processed so the delay variance removing queue has reached a predetermined length. The translated frames for the second network protocol are sent over a second communication link having a second communication bandwidth, the second communication bandwidth being less than the first communication bandwidth.

In another embodiment of the present invention, received frames that do not have the selected encoded-information-type are discarded and not stored in the delay variance removing queue. In yet another embodiment of the present invention, a new encoded-information-type may be selected for a specified time period (e.g., to send data) and all frames that do not have the new encoded-information-type are discarded during the specified time period.

The method and apparatus allow received frames with a selected-information-type to be discarded in a multimedia gateway without significantly affecting the quality of information when a first network protocol (e.g., H.323/LAN) is translated into a second network protocol (e.g., H.320, H.323/PPP, H.324, H.32x, etc.). The discarding of information is often necessary since frames are arriving on a communication link with larger bandwidth faster than they can be translated and sent on a communication link with smaller bandwidth.

The foregoing and other features and advantages of a preferred embodiment of the present invention will be more readily apparent from the following detailed description, which proceeds with references to the accompanying drawings.

BRIEF DESCRIPTION OF THE DRAWINGS

FIGS. 2A and 2B are a flow diagram illustrating a method for adaptively prioritizing between two or more information types received on a communication link;

FIG. 5 is a flow diagram illustrating a first method of discarding frames from a delay variance removing queue;

FIG. 6 is a block diagram illustrating the method of FIG. 5;

FIG. 7 is a flow diagram illustrating a second method of discarding frames from a delay variance removing queue;

FIG. 8 is a block diagram illustrating the method of FIG. 7;

FIG. 9 is a flow diagram illustrating a method for discarding received frames;

FIG. 10 is a block diagram illustrating the method of FIG. 9;

FIG. 11 is a flow diagram illustrating method for receiving frames with a new selected information type;

DETAILED DESCRIPTION OF A PREFERRED EMBODIMENT

Protocol Translation System

Figure 1:
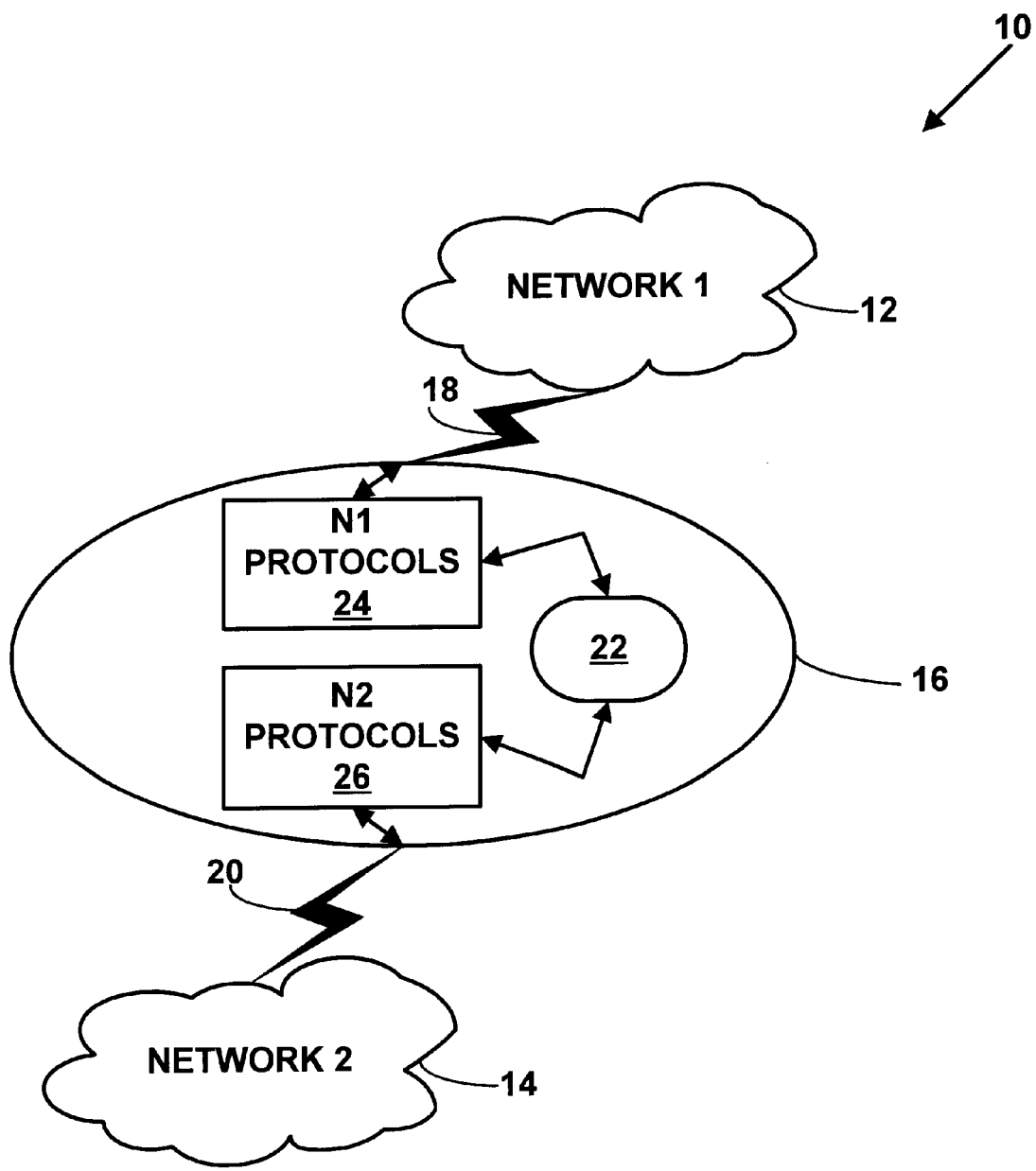
FIG. 1 is a block diagram of a computer network used to implement a preferred embodiment of the present invention.

FIG. 1 is a block diagram of a computer network 10 used to implement a preferred embodiment of the present invention. Computer network 10 includes a first computer network 12 and a second computer network 14 interconnected by an InterNetworking Device 16 ("IND"). However, more or fewer computer networks could be interconnected by IND 16 and the invention is not limited to interconnecting two computer networks. In addition, computer network 10 may include additional network devices (i.e., other than IND 16) and additional network nodes which are not shown in FIG. 1.

IND 16 is also called an "InterWorking Unit" ("IWU"), an "Intermediate System" ("IS") or a "gateway." IND 16 has multiple communication links 18 to first computer network 12 and multiple communication links 20 to second computer network 14 (illustrated as single connections 18 and 20 in FIG. 1). There may also be multiple virtual communication channels over the communication links (18, 20) (e.g., separate virtual channels for audio, video and data information). IND 16 has a software server 22 with a listing of network protocols 24 for first computer network 12 and a listing of network protocols 26 for second computer network 14. IND 16 uses software server 22 to translate network protocols that arrive on a communication link from one computer network into a protocol for another computer network without undue delay or loss of information.

For example, a first network protocol P1 that arrives over a first communication link 18 with a first communication bandwidth (e.g., 10 Mbps) from first computer network 12 is translated with software server 22 into a second network protocol P2 for second computer network 14 using protocol listings 24 and 26. Protocol P2 is sent over a second communication link 20 to second computer network 14. Second communication link 20 may have a second communication bandwidth (e.g., 28,800 bps) that is smaller than the first communication bandwidth but protocol P2 is sent without undue delay or loss of information.

An operating environment for IND 16 of the present invention includes a processing system with at least one high speed Central Processing Unit ("CPU"), in conjunction with a memory system. Although described with one CPU, alternatively multiple CPUs may be used.

The memory system includes main memory and secondary storage. The main memory is high-speed Random Access Memory ("RAM") and Read Only Memory ("ROM"). Main memory can include any additional or alternative high-speed memory device or memory circuitry.

Secondary storage takes the form of long term storage, such as ROM, optical or magnetic disks, organic memory or any other volatile or non-volatile mass storage system. Those skilled in the art will recognize that the memory system can comprise a variety and/or combination of alternative components.

In accordance with the practices of persons skilled in the art of computer programming, the present invention is described below with reference to acts and symbolic representations of operations that are performed by the processing system, unless indicated otherwise. Such acts and operations are referred to as being "computer-executed" or "CPU-executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile or non-volatile mass storage system readable by the computer. The computer readable medium includes cooperating or interconnected computer readable media, which exist exclusively on the processing system or be distributed among multiple interconnected processing systems that may be local or remote to the processing system.

Adaptive Prioritization of Multiple Information Types in a Protocol

Figure 2B:
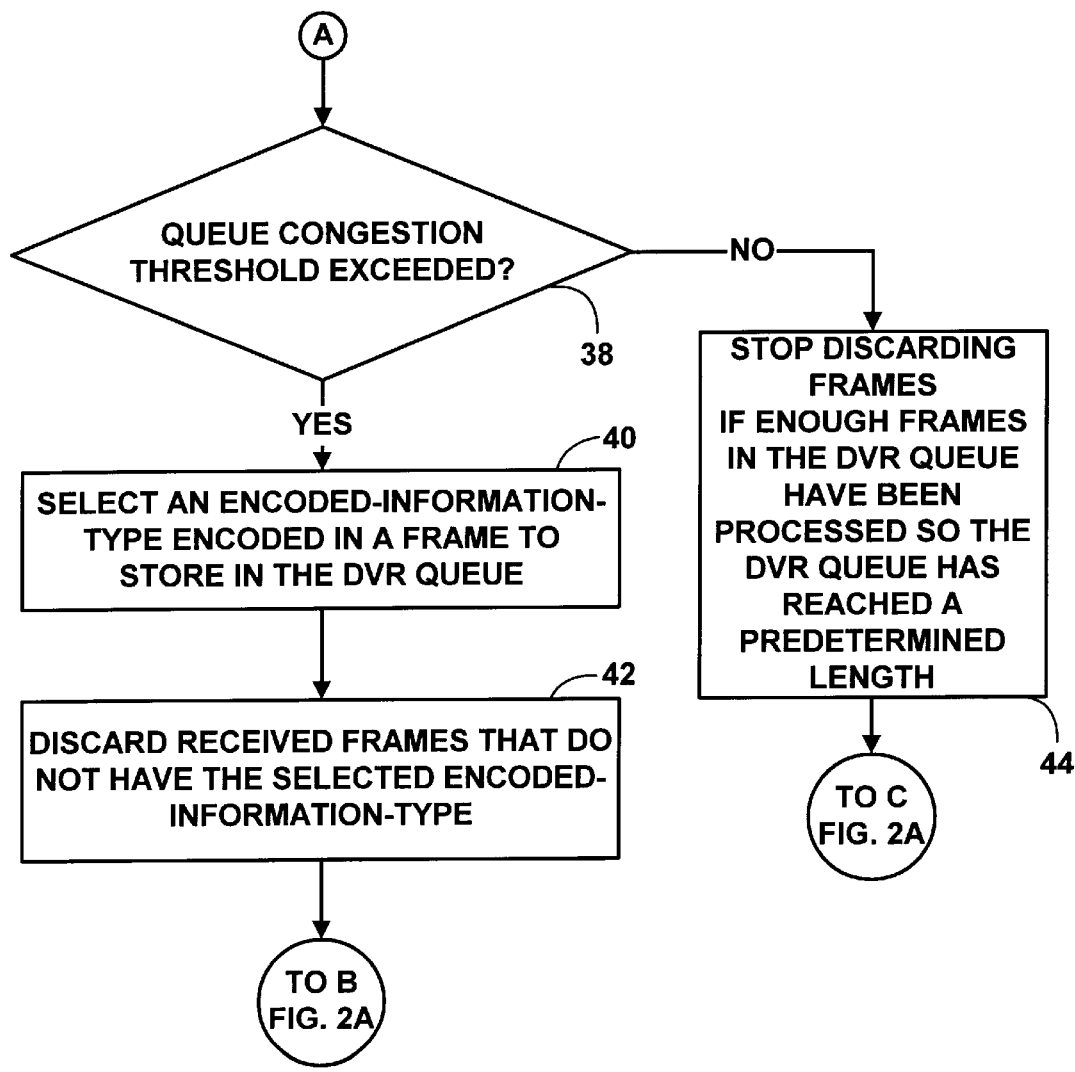

FIGS. 2A and 2B are a flow diagram illustrating a method 28 for prioritizing between two or more encoded-information-types for a selected network protocol received in frames over a communication link on an internetworking device such as IND 16. The frames include multiple data bits. At step 30 in FIG. 2A, multiple frames are received for a first network protocol over a first communication link having a first communication bandwidth. The multiple frames include multiple encoded-information-types (e.g., video codec frames, audio codec frames and data frames). For selected protocol translations (e.g., H.323→H.324) that require timing be maintained, received frames are stored in a Delay Variance Removing ("DVR") queue in memory in the internetworking device at step 32. The DVR queue allows IND 16 to compensate for packet sequencing and timing relationships during protocol translation. The frames from the DVR queue are translated into a second network protocol at step 34. In a preferred embodiment of the present invention, the second communication bandwidth is less than the first communication bandwidth but the translated frames are sent without undue delay or loss of information. However, the communication bandwidths may also be equivalent on both the first and second communication links.

Periodically, a test is completed at step 38 (FIG. 2B) to determine whether a number of frames arriving on the first network connection exceeds a predetermined queue congestion threshold. If the congestion threshold is exceeded, an encoded-information-type encoded in a frame is selected at step 40 to store in the DVR queue. Frames that do not have the selected encoded-information-type are discarded at step 42 until enough frames in the DVR queue are processed so the DVR queue reaches a predetermined length. When enough frames in the DVR queue are processed so the DVR queue reaches a predetermined length at step 38, discarding of frames that do not have the selected encoded-information-type is discontinued at step 44. Translated frames for the second network protocol are sent over a second communication link having a second communication bandwidth at step 36 (FIG. 2A).

The first and second communication links (18,20) in method 28 may also include two or more virtual channels. For example, the two or more virtual channels may include a first virtual channel for audio information and a second virtual channel for video information, and a third virtual channel for data information.

In another embodiment of the present invention, if no timing compensation is necessary, then the received frames are stored in a DVR queue used as a buffer. When the DVR queue is used as a buffer, no timing compensation is completed in the DVR queue. The buffer is used to allow a protocol from a larger bandwidth connection to be translated into a protocol used over a smaller bandwidth connection (e.g., H.323/LAN→H.323/PPP).

For an embodiment using the DVR queue as a buffer, returning to FIG. 2A at step 30, multiple frames are received for a first network protocol over a first communication link having a first communication bandwidth. The frames are stored in the buffer at step 32. The frames stored in the buffer are translated into a second network protocol at step 34. Periodically, a test is conducted at step 38 (FIG. 2B) to determine whether a number of frames arriving on the first network connection exceeds a predetermined buffer congestion threshold. If the buffer congestion threshold is exceeded, an encoded-information-type encoded in a frame is selected at step 40 to store in the buffer. Frames that do not have the selected encoded-information-type are discarded at step 42 until enough frames in the buffer are processed so the buffer reaches a predetermined length. When enough frames in the buffer are processed so the buffer reaches a predetermined length at step 38, discarding of frames that do not have the selected encoded-information-type is discontinued at step 44. Translated frames for the second network protocol are sent over a second communication link having a second communication bandwidth at step 36 (FIG. 2A).

As is known in the art, the Open Systems Interconnection ("OSI") model is used to describe computer networks. The OSI model consists of seven layers including from lowest-to-highest, a physical, data link, network, transport, session, application and presentation layer. The physical layer transmits bits over a communication link. The data link layer transmits error free frames of data. The network layer provides internetworking, determines routing information and controls a communications subnet. A communications subnet is a collection of transmission media required for routing and data transmission. Most INDs (e.g., gateways) operate at all levels in the OSI model.

Standards organizations such as the International Telecommunications Union-Telecommunication Standardization Sector ("ITU-T", formerly known as the CCITT), the Institute of Electrical and Electronic Engineers ("IEEE"), International Organization for Standards ("ISO") and others establish recommendations for standard network protocols. Devices connected to computer networks such as INDs typically use standard protocols as well as proprietary protocols to communicate with other devices in a computer network. INDs identify both standard and proprietary network protocols.

In one embodiment of the present invention, method 28 is used to translate audio/video conferencing protocols in a multimedia gateway (e.g., IND 16) that are received for audio/video conferencing. First communication link 18 is a LAN communication link with an exemplary bandwidth of 10 Mbps. Second communication link 20 is a serial communication link via a modem with an exemplary bandwidth of up to 56,000 bps. However, the invention is not limited to the exemplary bandwidths, and other bandwidths may also be used for the first and second communication links (18, 20).

Method 28 is used in IND 16 with a DVR queue or with a DVR queue as a buffer for translating between ITU-T H.323 and H.323 (e.g., H.323/LAN and H.323/PPP), H.323 and ITU-T H.324, H.323 and ITU-T H.320 or ITU-T H.32x protocols, where "x" represents a protocol in the ITU-T H.320 series. As is known in the art, ITU-T H.324, entitled "Terminal for Low Bit Rate Multimedia Communication" is the ITU-T recommendation for standard videoconferencing using Plain Old Telephone Service ("POTS") lines. H.324 uses ITU-T H.223 for its data link layer. H.223 is entitled "Multiplexing Protocol for Low Bitrate Communications." ITU-T H.323, entitled "Visual Telephone Systems and Terminal Equipment for Local Area Networks That Provide a Non-Guaranteed Quality of Service," and H.323 version-2, entitled "Packet Based Multi-media Communication Systems," are the main family of video conferencing recommendations for Internet Protocol ("IP") networks. H.323 uses H.225, entitled "Media Stream Packetization and Synchronization on Non-Guaranteed Quality of Service LANs" or H.225 version-2 entitled "Call Signaling Protocols and Media Stream Packetization for Packet Based Multi-media Communication Systems" for its data link layer. ITU-T H.320, entitled "Narrowband Visual Telephone Systems and Terminal Equipment," is a standard protocol for videoconferencing using ISDN or similar telephone circuits.

For example, IND 16 using method 28 will identify H.323 sent by first computer network 12 over communication link 18 (a LAN communication link), translate H.323 data into H.320, H.324 or H.32x and send it to second computer network 14 over communication link 20 (a serial communication link, or a LAN communication link). IND 16 could also identify H.323 from second computer network 14 sent over communication link 20, translate H.323 data into H.320, H.324 or H.32x data, and send it to first computer network 12 over communication link 18. First computer network 12 and second computer network 14 would then have a two-way audio/video conferencing communication path.

During an audio/video conferencing call, audio information is typically supplied by audio Input/Output ("I/O") equipment (e.g., a microphone/speaker) that uses an audio coder/decoder ("codec") to capture audio information. Audio codecs are known to those skilled in the art and include G.711, G.722, G.723.1.1.1, G.728 and G.729. However, other audio codecs could also be used.

Video information is captured by video I/O equipment (e.g., a video camera) that uses a video codec. Video codecs are known to those skilled in the art and include H.261 and H.263 video codecs. However, other video codecs could also be used. ITU-T H.261, entitled "Video Codec for Audiovisual Services at P×64 Kbit/sec," defines video coding based on P-number of 64,000 bps channels (e.g., ISDN 64K bps B-channels) where P is two or more. H.261 is a video coding method designed for H.320, H.323 and other H.32x protocols. ITU-T H.263, entitled "Video Coding for Low Bit Rate Communication" is a video coding method used for H.323, H.324. and other H.32x protocols. H.263 uses the techniques of H.261 plus significant enhancements. For example, H.263 uses half pixel precision for motion compensation while H.261 uses full pixel precision and a loop filter. H.263 supports five resolutions including Quarter Common Interchange Format ("QCIF"), Common Interchange Format ("CIF"), 4CIF, 16CIF, which are four and sixteen times the resolutions of CIF, and Sequenced Quarter Common Interchange Format ("SQCIF"). H.261 supports only QCIF and CIF.

H.263 uses three types of video codec frames as is shown in Table 1 below.

TABLE 1

| H.263 Codec Frame Types | Description |
| --- | --- |
| I-Frame | I-frames are intra frames which are encoded similarly to Joint Picture Expert Group ("JPEG"). This means, no motion compensation prediction is used. These frames are sent periodically (e.g., every second) to enable a decoder to recover from errors. The frame size of an I-frame can be 5K bits to 50K bits for Quarter Common Interchange Format ("QCIF") and larger for Common Interchange Format ("CIF"). |
| P-Frame | P-frames are error values for the motion compensation prediction process that is used. If the motion prediction process is good, P-frames consist of motion vectors with no error data. If the motion compensation prediction process is bad the error data is usually between 100 bits and 10K bits of data. |
| B-Frame | B-frames are predicted using a previous I-frame or P-frame and a current P-frame. The main use of B-frames is the ability to increase the frame rate with only a minimal amount of increase in the bit rate. B-frames are not sent alone but are combined with P-frames. |
| PB-Frame | PB-frames are P-frames jointly encoded with a B-frame. The PB-frames are two frames and there is a delay of one frame involved. PB-frames average about 200 bits to 20K bits of data. |

P, and PB frames are used to lower the total amount of bits transmitted to display a video image by sending motion compensation prediction errors. I-frames are sent periodically to recover from the motion compensation prediction of the P, and PB frames. Sending I-frames is necessary but not desirable since the I-frame contains bits representing the whole video image while P and PB frames contain bits representing only changes in the video image since the last frame (I, P, or PB) was sent. For example, an I-frame may contain 5000–50,000 bits of information, while a P-frame may contain 100–10,000 bits of information. The P, and PB frames can be transmitted faster and reduce the congestion on the communication link.

The H.245 and T.120 protocols and Point-to-Point Protocol ("PPP") are also used during audio/video conferencing. H.245, entitled "Control Protocol for Multimedia Communication," defines initiation of communications between systems and negotiation of capabilities procedures.

T.120, entitled "User Data Transmission Using a Multi-Layered Protocol ("MLP") is the ITU-T recommendation for data conferencing. PPP is used to encode network layer data over a serial communication link. For more information on H.320, H.323, H.324, H.261, H.263, H.245 and T.120 see *"Mainstream Videoconferencing: A Developer's Guide to Distance Multimedia"* by Joe Duran and Charlie Sauer, Addison, Wesley, Reading, Mass., 1997 or *"Videoconferencing and Videotelephony: Technology and Standards"*, by Richard Schaphorst, Artech House, Norwood, Mass., 1996.

For more information on PPP see *Internet Request For Comments* ("RFC") 1060. The above documents are expressly incorporated herein by reference.

Audio, video, data and control information (G.7xx, H.261, H.263, H.245, T.120) is encoded in H.225 frames for use with H.323 and H.223 frames for use with H.324. The H.225 and H.223 frames are data link frames used in the OSI data link layer over first and second communication links (18,20). The video codec frames (J, P, and PB) are encoded in H.225 or H.223 frames. The multimedia information encoded in the H.225, H.223 or other frames is hereinafter referred to as "encoded-information-types."

On the larger bandwidth communication link 18 using H.323 (i.e., LAN or other network side) contention losses, retries and unreliable links indicate protocol information packets may be lost or delayed an indeterminable amount of time. Thus, first computer network 12 may use Real-Time Protocol ("RTP") in its protocol stack to provide a timing synchronization and sequence number mechanism when H.323 is used. RTP allows the H.323 to compensate for packets varied in time and lost packets. However, H.323 may use other protocols for packet timing and sequencing.

The H.324 protocol typically does not provide any timing relationships like those provided with RTP in H.323. Thus, IND 16 provides packet synchronization after translation before sending the packet to the H.324 side. A DVR queue in IND 16 is used to provide packet synchronization and sequencing. Packet and time sequencing is not required for H.323-to-H.323 (e.g., H.323/LAN→H.323/PPP) translation, and DVR queue is used as a buffer in IND 16 for such an embodiment.

Figure 3:
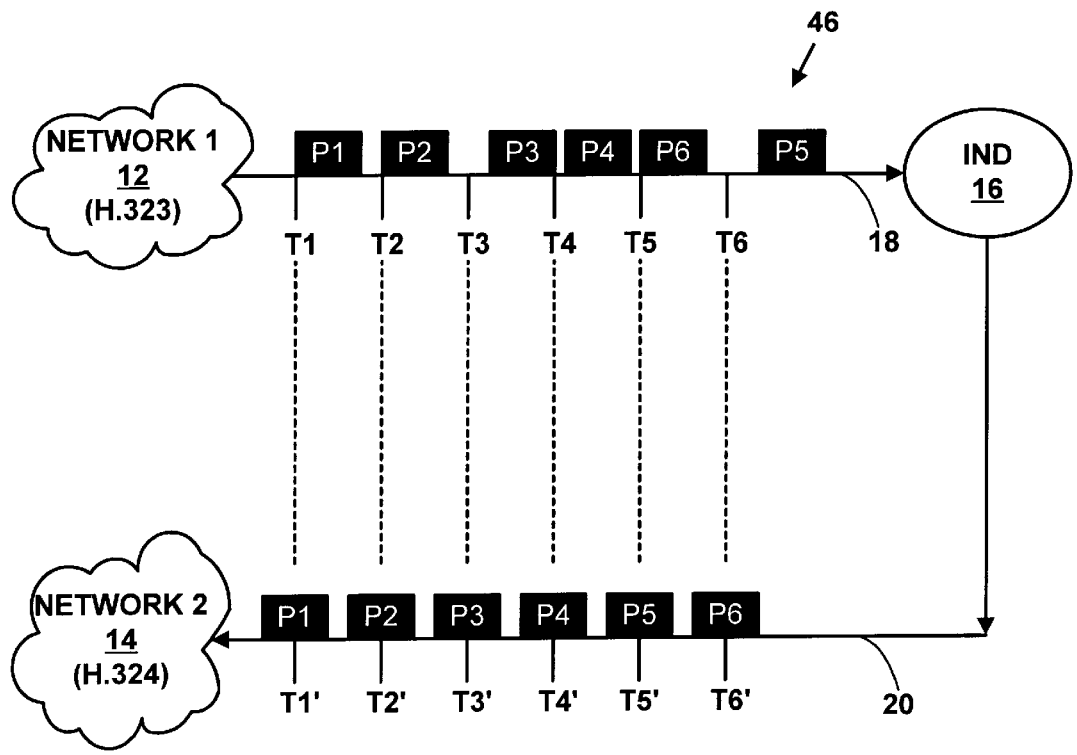
FIG. 3 is block diagram illustrating a packet synchronization in an internetworking device.

FIG. 3 is a block diagram 46 illustrating packet synchronization in IND 16. As is shown in FIG. 3, IND 16 receives H.323 packet information (e.g., audio, video and data information) from first computer network 12, over first communication link 18. First communication link 18 is a larger bandwidth communication link (e.g., a 10 Mbps LAN communication link) than second communication link 20 (e.g., a 56,000 bps serial line communication link). The H.323 packets are sent as H.225 frames over communication link 18 to IND 16. IND 16 translates H.323 into H.324 and sends H.324 information to second computer network 14 over second communication link 20 as H.223 frames. H.324 and H.320 provide timing and sequencing relationships at a source. However, H.324 or H.320 do not provide any in-stream timing as is provided by RTP in H.323. H.324 and H.320 align data streams at a source and then "assume" that the underlying transmission medium will not cause an "jitter" (i.e., timing variations in the transmitted frames). As a result, IND 16 provides packet timing synchronization and packet sequencing in the DVR queue before sending H.324 data packets to second computer network 14. IND 16 removes transmission "jitter" as well as provides "lip synchronization" for H.323→←H.324 translation. For, H.323/LAN→←H.323/PPP translation, no timing synchronization is required, so IND 16 does not provide either jitter removal or lip synchronization, but does provide the data rate adaptation described above (i.e., 10 Mpbs→←56,000 bps or other modem speeds).

As is shown in FIG. 3, first computer network 12 sends six H.323 protocol packets numbered P1, P2, P3, P4, P6, and P5 to IND 16 over first communication link 18. The packets would be received in H.225 frames. Packet P6 was sent before packet P5 (i.e. is out of sequence). The packets are sent in a "bursty" manner as is illustrated by the timing marks T1–T6. IND 16 accepts the packets in H.225 frames and stores them in the DVR queue.

IND 16 translates the packets from the DVR queue into H.324 protocol, and synchronizes the packets for output on second communication link 20 to second computer network 12 (e.g., provides audio/video "lip" synchronization). The H.324 packets are output as H.223 frames using the sequence numbers and the appropriate timing as is illustrated by timing marks T1'–T6'. Packets P1, P2 and P3 are output on timing marks T1' T2' and T3' respectively. Packets P6 and P5 have been re-ordered in the proper sequence and output on timing marks T5' and T6' respectively. Thus, H.324 packets are output with the proper timing and packet sequencing by IND 16. IND 16 gives H.320 and H.324 a constant stream of output packets even though the H.320 and H.324 do not include timing values with each packet. No audio/video synchronization or "lipsync" is required for H.323-to-H.323 translation (e.g., H.323/LAN→H.323/PPP).

Figure 4:
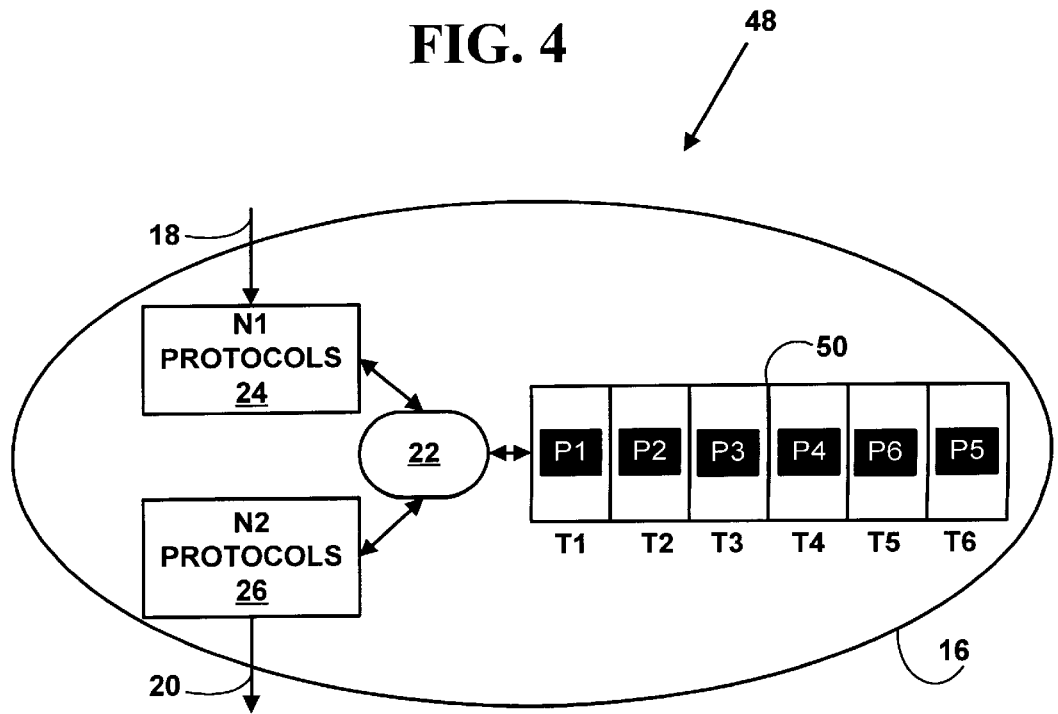
FIG. 4 is a block diagram illustrating a delay variance removing queue in an internetworking device.

FIG. 4 is a block diagram 48 illustrating a DVR queue 50 used in IND 16. DVR queue 50 illustrates the packet sequence received from first computer network 12 in FIG. 3. In a preferred embodiment of the present invention, DVR queue 50 is a predetermined fixed length. If first communication link 18 is a larger bandwidth than second communication link 20, DVR queue 50 may overflow and frames containing the packets are discarded as is illustrated in method 24. Software server 22 in IND 16 uses DVR queue 50 to provide packet sequencing and packet timing synchronization when translating between two network protocols (e.g., H.323 and H.324) that require timing synchronization.

Method 28 (FIGS. 2A and 2B) is illustrated with one embodiment of the present invention. First computer network 12 (FIG. 1) uses H.323 and sends H.225 frames with multimedia information (e.g., audio, video and data information) as encoded-information-types to IND 16 over first communication link 18 which has first bandwidth (e.g., 10 Mbps). Second computer network 14 uses H.324 and receives H.223 frames with the encoded-information types from IND 16 over second communication link 20 which has a second smaller bandwidth (e.g., 28,800 bps) without undue delay or loss of information. However, the present invention is not limited to this illustrative embodiment and other embodiments may be used and the H.323 protocol can be translated into H.320 and H.323 by IND 16.

At step 30 (FIG. 2A) of method 28, multiple H.225 frames are received for the H.323 protocol over first communication link 18. The multiple frames include encoded multimedia information (e.g., encoded audio, video and data information) as encoded-information-types. The H.225 frames include multiple video codec encoded-information-types shown in Table 1. The received H.225 frames are stored in DVR queue 50 (FIG. 4) in a memory of IND 16 at step 32. The H.225 frames with H.323 data from DVR queue 50 are translated into H.223 frames for H.324 at step 34. DVR queue 50 is used to provide packet sequencing and packet timing synchronization. The translated H.223 frames are sent over second communication link 20 at step 36.

Periodically (e.g., once per second), a test is completed at step 38 (FIG. 2B) to determine whether the number of H.225 frames containing multimedia information arriving on first network connection 18 exceeds a predetermined queue congestion threshold for DVR queue 50. The queue congestion threshold is determined based on the size of DVR queue 50. If the queue congestion threshold is exceeded, an encoded-information-type is selected at step 40 (e.g., H.263 I-frames encoded in H.225 frames).

For example, H.263 I-frames are video codec frames without any motion compensation predictions, and H.263

P-frames, frames, and PB-frames include errors for motion compensation predication. The H.263 P, and PB frames can be discarded and only the H.263 I-frames encoded in H.225 frames are used to transmit audio/video conferencing data. I-frames are sent periodically and allow a video decoder to recover from any motion prediction errors generated by P and PB frames.

H.225 frames that do not have the selected encoded-information-type (e.g., H.225 frames with encoded P, and PB frames) are discarded at step 42 until the number of frames arriving on first communication link 18 is less than the predetermined queue congestion threshold. H.225 frames with the selected encoded-information-type (e.g., H.263 I-frames) are stored in DVR queue 50 at step 32 to allow translation between H.323 and H.324 at step 34. When enough frames in the DVR queue are processed so the DVR queue reaches a predetermined length at step 38, discarding of frames that do not have the selected encoded-information-type is discontinued at step 44.

Since one of the communication links typically has a larger communication bandwidth than the other communication link, method 24 is used to compensate for the differences in communication bandwidth, timing and sequencing without undue delay or loss of information. Method 28 is described with respect to video codec information (i.e., H.263 video code I, P, and PB frames). However, method 28 can also be used with audio information from the audio codecs described above (e.g., selecting between audio codec data for lower and higher fidelity audio) and with data information. Method 28 can also be used for translating protocols that do not require timing synchronization with a DVR queue.

In an another embodiment of the present invention, X-number of frames which do not have the selected encoded-information-type are discarded at step 42 until Y-number of frames with the selected encoded-information-type are stored in DVR queue 50 at step 32 before checking the queue congestion threshold again at step 38.

In another embodiment of the present invention, a flow control message is sent by IND 16 over first communication link 18 to first computer network 12 to practice frame discarding at step 42. In such an embodiment, a flow control message is sent via the H.245 protocol and requests first computer network 12 send frames with encoded-information-types at a rate less than the available bandwidth on first communication link 18 so more frames are processed. A timer is set on 1ND 16 with a predetermined congestion control (e.g., 1 second) value to allow IND 16 to process the frames stored in DVR queue 50. When the timer expires, a second control flow message is sent with H.245 protocol to inform first computer network 12 that it may send frames with encoded-information-types again using the available bandwidth on first communication link 18.

Adaptive Prioritization of Multimedia Protocols

In a preferred embodiment of the present invention, selected frames are discarded at step 42 from DVR queue 50 with method 52. FIG. 5 is a flow diagram illustrating a method 52 for discarding received frames from DVR queue 50. At step 54, a first location in DVR queue 50 is determined containing a first frame with the selected encoded-information-type (e.g., H.225 frame with an encoded H.263 I-frame). At step 56, a second location is determined containing a second frame with the selected encoded-information-type. The frames (P, and multiple PB frames) between the first and second locations are discarded at step 58, thereby increasing space in DVR queue 50. As was discussed above, encoded H.263 P, and PB frames can be discarded since encoded I-frames alone can be used to display video information. If a first location in DVR queue 50 containing a first frame with the selected encoded-information type cannot be found at step 54, frames are discarded from the DVR queue until a frame with the selected encoded-information type arrives. Method 52 can also be used to discard frames from a buffer used for translating protocols that do not require timing synchronization with a DVR queue.

FIG. 6 is a block diagram 60 illustrating method 52. First location 62 (FIG. 6) determined at step 54 (FIG. 5) contains a first I-frame encoded in a H.225 frame. Second location 64 (FIG. 6) determined at step 56 (FIG. 5) contains a second encoded I-frame. The encoded P, and multiple PB frames between first and second locations (62,64) are discarded at step 58 thereby increasing space in DVR queue 50.

In another embodiment of the present invention, selected frames are discarded at step 42 from DVR queue 50 with method 66. FIG. 7 is a flow diagram illustrating a method 66 for discarding received frames from the DVR queue 50. At step 68, a first location containing a first frame with the selected encoded-information-type (e.g., H.225 frame with an encoded I-frame) is determined. At step 70, frames in locations before first location 62 in the queue are discarded thereby increasing space in DVR queue 50. Method 66 can also be used to discard frames from a buffer used for translating protocols that do not require timing synchronization with a DVR queue.

FIG. 8 is a block diagram 72 illustrating method 66. At step 68 (FIG. 7), a first location 74 (FIG. 8) is determined containing a H.225 frame with an encoded I-frame. At step 70 (FIG. 7), the H.225 frames with encoded P, and multiple PB frames before first location 74 (FIG. 8) arc discarded thereby increasing space in DVR queue 50.

In another embodiment of the present invention, selected frames are discarded at step 42 as they are received with method 76 and are not stored in DVR queue 50. FIG. 9 is a flow diagram illustrating method 76 for discarding frames as they are received. At step 78, an average time period is determined when a frame with a selected encoded-information-type is received (e.g., a H.225 frame with an encoded H.263 I-frame). At step 80, a timer is set with the average time period. At step 82, frames are discarded until the timer expires or a frame with the selected encoded-information-type is received. Method 76 can also be used to discard frames from a buffer used for translating protocols that do not require timing synchronization with a DVR queue.

FIG. 10 is a block diagram 84 illustrating the method of FIG. 9. It is determined at step 78 that a H.225 frame with a selected encoded-information-type (e.g., an I-frame) is received every 0.5 seconds at locations 86, 88 and 90 corresponding to time periods of zero, 0.5 and one second. A timer would be set with the average time period of 0.5 seconds step 80. Frames are discarded until the timer expires or a frame with the selected encoded-information-type is received at step 82. The average time period determined is typically determined for a longer time period than is shown in FIG. 10 (e.g., over 1–2 minutes). The average time period may also be adjusted dynamically as the content of the audio/video conferencing information changes.

In another embodiment of the present invention, a request may be made by a computer network to select a new encoded-information-type for a specified time period (e.g., to send data) and discard all other frames with other encoded-information-types received during the specified time period.

FIG. 11 is a flow diagram illustrating method 92 for receiving frames with a new encoded-information-type. At step 94, a selection input is received from a computer network indicating a time period for continuously receiving frames with a new selected encoded-information-type. For example, IND 16 may receive a selection input from first computer network 12 for establishing a virtual data channel for T.120 data. T.120 could be used to send a spreadsheet or other collection of information data during the audio/video conference. At step 96, a timer is set with the indicated time period received in the selection input. At step 98, other frames received with encoded information (e.g., H.263 I, P, and PB frames) are discarded that do not have the new selected encoded-information-type (e.g., T.120) until the timer expires.

Adaptive Prioritization Systems

Figure 12A:
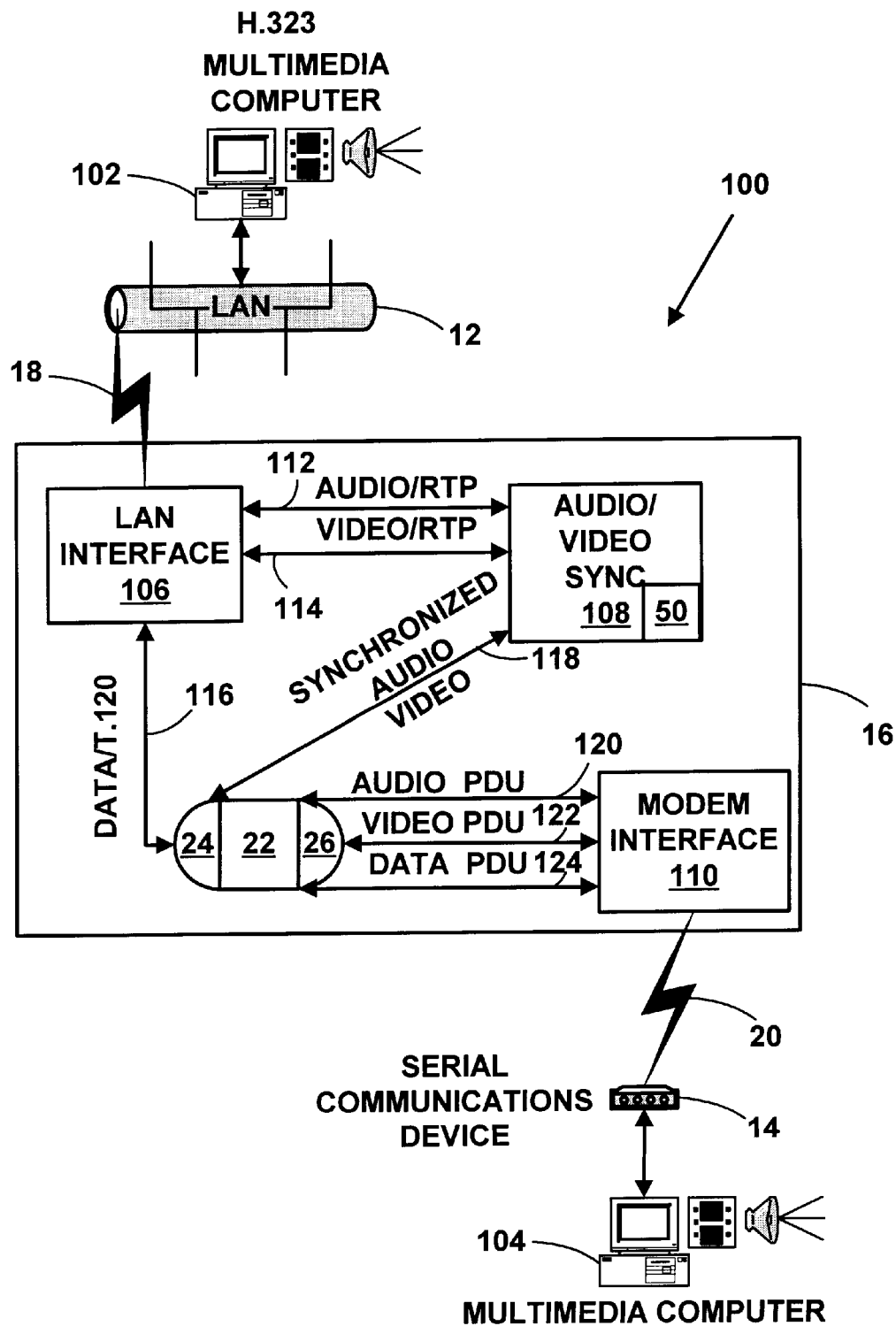
FIG. 12A is a block diagram illustrating a protocol translation system.

FIG. 12A is a block diagram illustrating a protocol translation system 100 for one illustrative embodiment of the present invention. A first multimedia computer 102 is connected to first computer network 12, which is a LAN. First computer network 12 is connected to IND 16 with first communication link 18 (e.g., a LAN connection at 10 Mbps). Multimedia computer 102 is using H.323 protocol for audio/video conferencing with a second multimedia computer 104 using H.324 protocol. Second multimedia computer 104 is connected to a second computer network 14, which is a serial communications device (e.g., a modem). Second computer network 14 uses a second communication link 20 (e.g., a serial telephone line at 56,000 bps, an ISDN line, etc.) to connect to IND 16.

IND 16 includes a LAN interface 106, a audio/video synchronization device 108 and a modem interface 110. Multimedia information (voice, video and data) is sent from multimedia computer 102 from first computer network 12 to IND 16 over communication link 18 as H.225 frames. Communication link 18 may have multiple virtual channels for audio, voice and data information. LAN interface 106 in IND 16 sends 112 audio information via RTP and sends 114 video information via RTP to audio/video synchronization device 108. RTP was explained above. T.120 data is sent 116 from LAN interface 106 to software server 22 using Transmission Control Protocol ("TCP") or another data transmission protocol known in the art. However, TCP may or may not terminate on IND 16 depending on the type of data protocol being used. In addition, other protocols could also be used to send audio, video or data information.

Audio/video synchronization device 108 is used synchronize audio and video information so audio information corresponds to a video image. For example, loss of lip synchronization for an audio/video conferencing call between two people is highly undesirable, so audio and video information is synchronized. In one embodiment of the present invention, audio/video synchronization device 108 uses DVR queue 50 (FIG. 4) along with software comprising packet sequencing and packet timing synchronization functionality. DVR queue 50 is used to provide packet sequencing and packet timing synchronization when translating between two network protocols as was explained above and illustrated in FIGS. 3 and 4.

Software server 22 uses method 28 and one or more of methods 52, 66, 76 and 92 described above to translate H.323 protocol information into H.324 protocol information and uses protocol translation tables 24 and 26 (FIG. 1). Software server 22 receives synchronized audio/video data over connection 118. Software server 22 uses audio codec Protocol Data Units ("PDUs") such as PDUs for the G.723.1 audio codec known in the art to send 120 synchronized audio information to modem interface 110. However, other audio codec PDUs could also be used (e.g., G.711, G.722, G.728, or G.729). Software server 22 uses a video codec PDU such as a H.263 video codec PDU to send 122 synchronized video information to modem interface 110. However, other video codec PDUs could also be used (e.g., H.261). Software server 22 sends 124 any T.120 data received on TCP input 118 to modem interface 110 as data PDUs for a LAPM or other modem interface protocol known in the art. However, other protocols could also be used (e.g., V.14).

Software server 22 translates H.323 protocol information encoded in H.225 frames into H.223 frames with H.324 protocol information using audio/video synchronization device 108 and data input 116 and sends the H.324 protocol information as H.223 frames to modem interface 110. Modem interface 110 outputs H.324 protocol to first computer network 14 (i.e., modem) which is connected to multimedia computer 104. Multimedia computer 104 can also initiate an audio/video conference with multimedia computer 102, and the audio/video conferencing communication just described would be executed in reverse order (i.e., H.324→H.323).

Figure 12B:
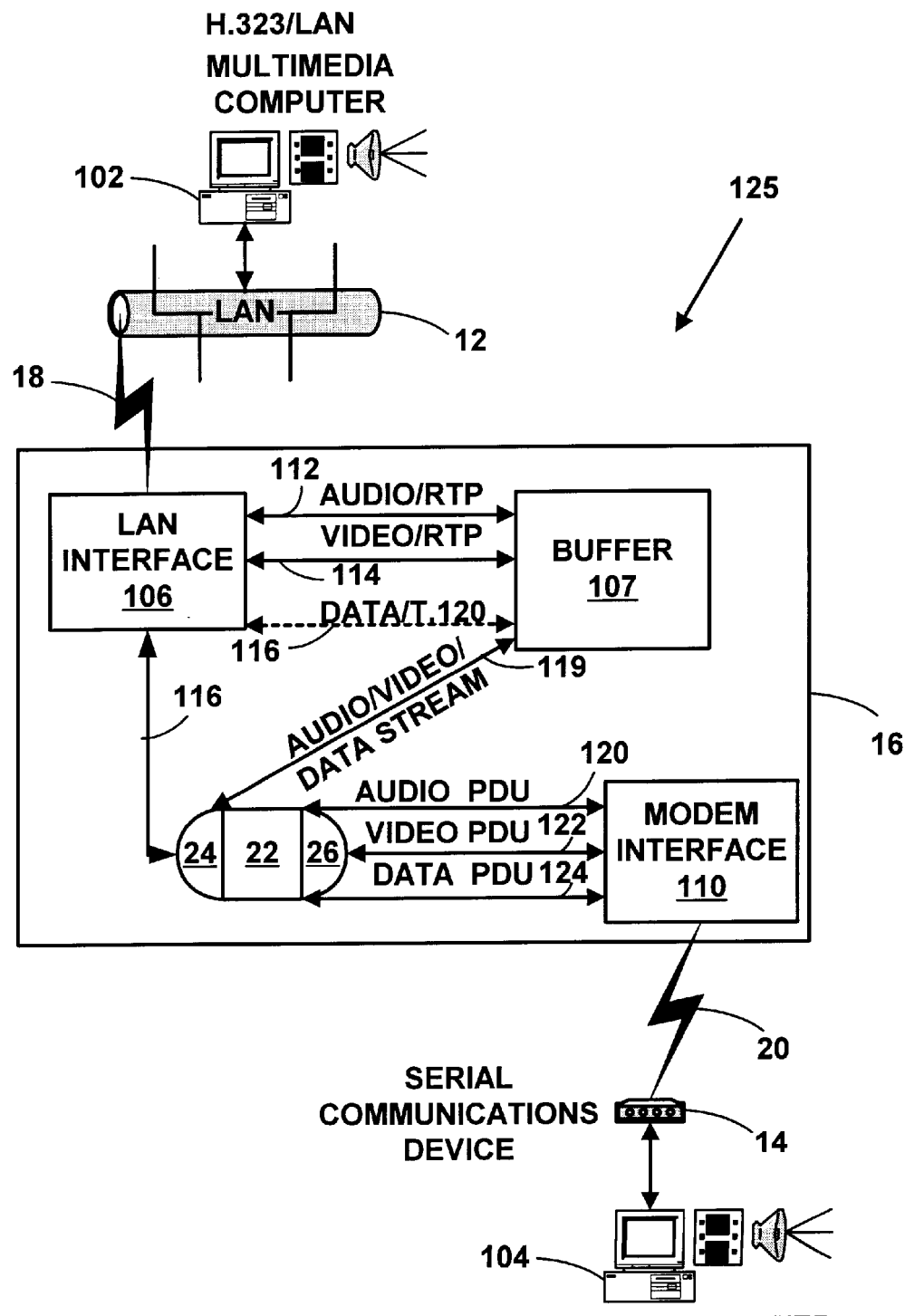
FIG. 12B is a block diagram illustrating another protocol translation system.

FIG. 12B is a block diagram illustrating a protocol translation system 125 for a preferred embodiment of the present invention. A first multimedia computer 102 is connected to first computer network 12 that is a LAN. First computer network 12 is connected to IND 16 with first communication link 18 (e.g., a LAN connection at 10 Mbps). Multimedia computer 102 is using H.323/LAN protocol for audio/video conferencing with a second multimedia computer 104 using H.323/PPP protocol. Second multimedia computer 104 is connected to a second computer network 14, which is a serial communications device (e.g., a modem). Second computer network 14 uses a second communication link 20 (e.g., a serial telephone line at 56,000 bps, an ISDN line, etc.) to connect to IND 16. No audio/video synchronization is required to translate between H.323/LAN and H.323/PPP so audio/video synchronization device 108 and DVR queue 50 are replaced by buffer 107. LAN interface 106 in IND 16 sends 112 audio information via RTP and sends video information 114 via RTP to buffer 107. T.120 data is optionally sent 116 from LAN interface 106 to buffer 107 or directly to software server 22 with TCP or another transmission protocol. Audio/video stream and optional data stream 119 is sent from buffer 107 to software server 22 for translation. Software server 22 translates H.323/LAN into H.323/PPP protocol information using and sends the H.323/PPP protocol information to modem interface 110. Modem interface 110 outputs the H.323/PPP protocol to first computer network 14 (i.e., modem) which is connected to multimedia computer 104. Multimedia computer 104 can also initiate an audio/video conference with multimedia computer 102, and the audio/video conferencing communication just described would be executed in reverse order (i.e., H.323/PPP→H.323/LAN).

Visual Congestion Indicators

Figure 13:
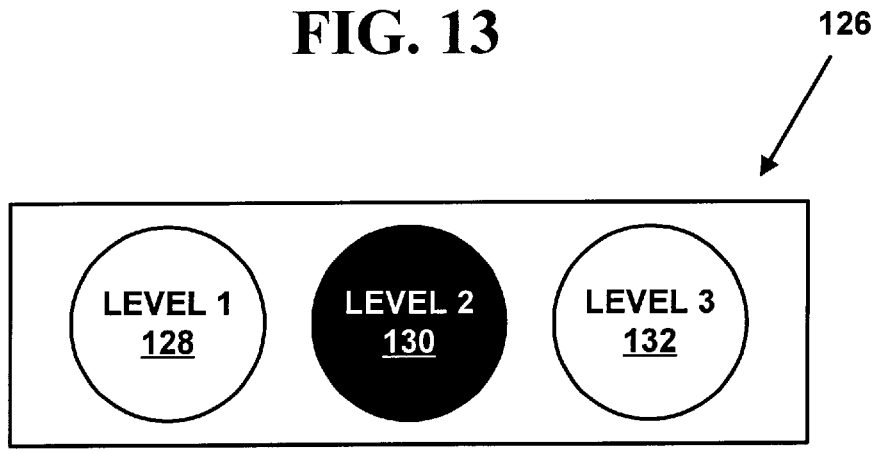
FIG. 13 is a block diagram illustrating a visual queue congestion indicator.

In one embodiment of the present invention, IND 16 includes a visual indication of any congestion in DVR queue 50 or a buffer used in place if DVR queue 50. FIG. 13 is a block diagram illustrating a visual queue congestion indicator 126. Visual Queue congestion indicator 126 includes a first congestion indicator 128, a second congestion indicator 130 and a third congestion indicator 132 which are three different colors (e.g., green, yellow and red). Only one congestion indication 128, 130 or 132 is displayed at any instance of time. For example, in FIG. 13, only second congestion indicator 130 is displayed. The congestion indicators are used as a visual indication of the amount of congestion in DVR queue 50 or buffer and can be implemented in hardware as Light Emitting Diodes or other hardware components on IND 16 or in software as graphical shapes on a display associated with IND 16. The visual congestion indicators (128,130,132) are not limited to the circle shapes shown in FIG. 13.

For example, the first congestion indicator 128 (e.g., a green color) may indicate no congestion or a small amount of congestion. In one embodiment of the present invention, when first congestion indicator is displayed, methods 52 and 66 are used by IND 16 to discard frames from DVR queue 50 or buffer thereby increasing space in the DVR queue or buffer. When second congestion indicator 130 is displayed (e.g., a yellow color) an intermediate amount of congestion is occurring in DVR queue 50 or buffer. IND 16 uses method 78 to discard frames until a timer expires or a frame with a selected encoded-information-type is received. For example, all H.263 P, and PB frames encoded in H.225 are discarded until an H.263 I-frame is received. When third congestion indicator 132 is displayed (e.g., a red color), a major amount of congestion is occurring in DVR queue 50 or buffer. IND 16 sends a H.245 control message to ask a computer network to send frames at less than the available bandwidth for a determined period of time. IND 16 may also drop all frames received until the frames in DVR queue 50 or buffer are processed.

Figure 14A:
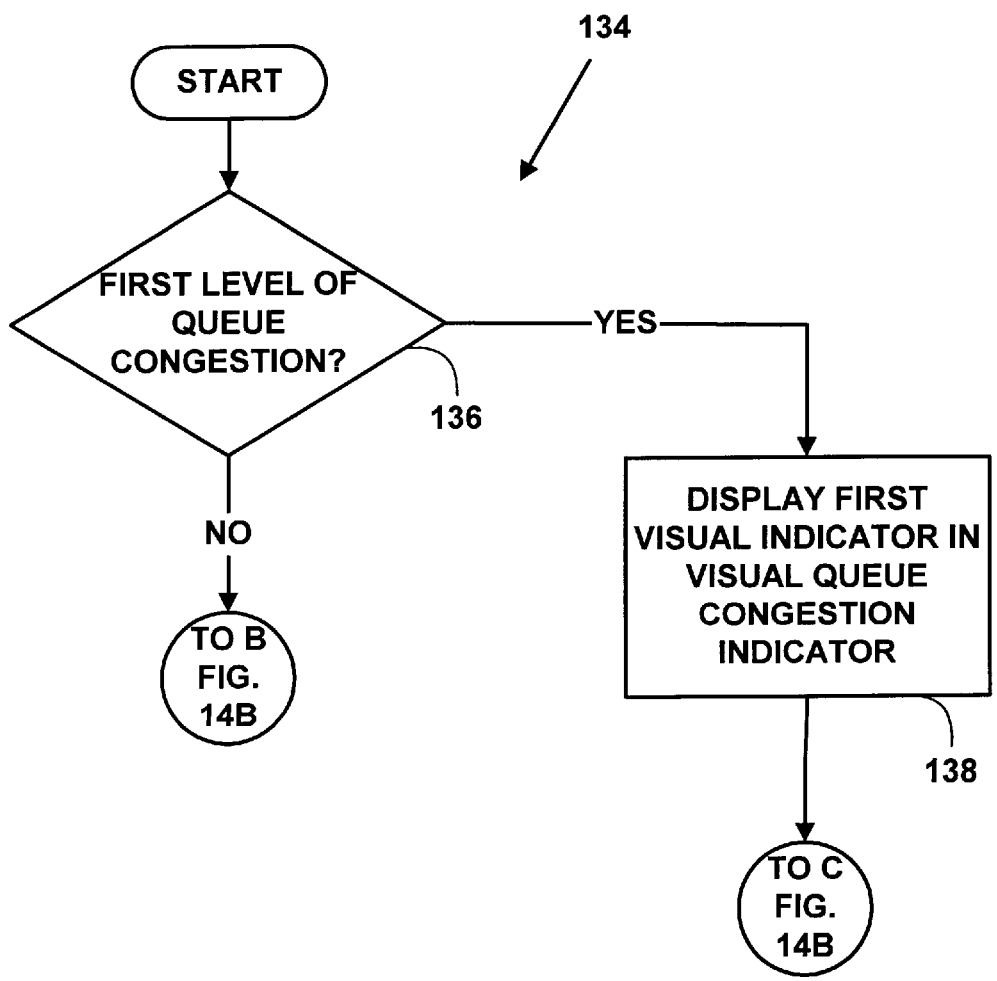
FIGS. 14A, 14B and 14C are a flow diagram illustrating a method for displaying a visual indication of congestion in a queue.
Figure 14B:
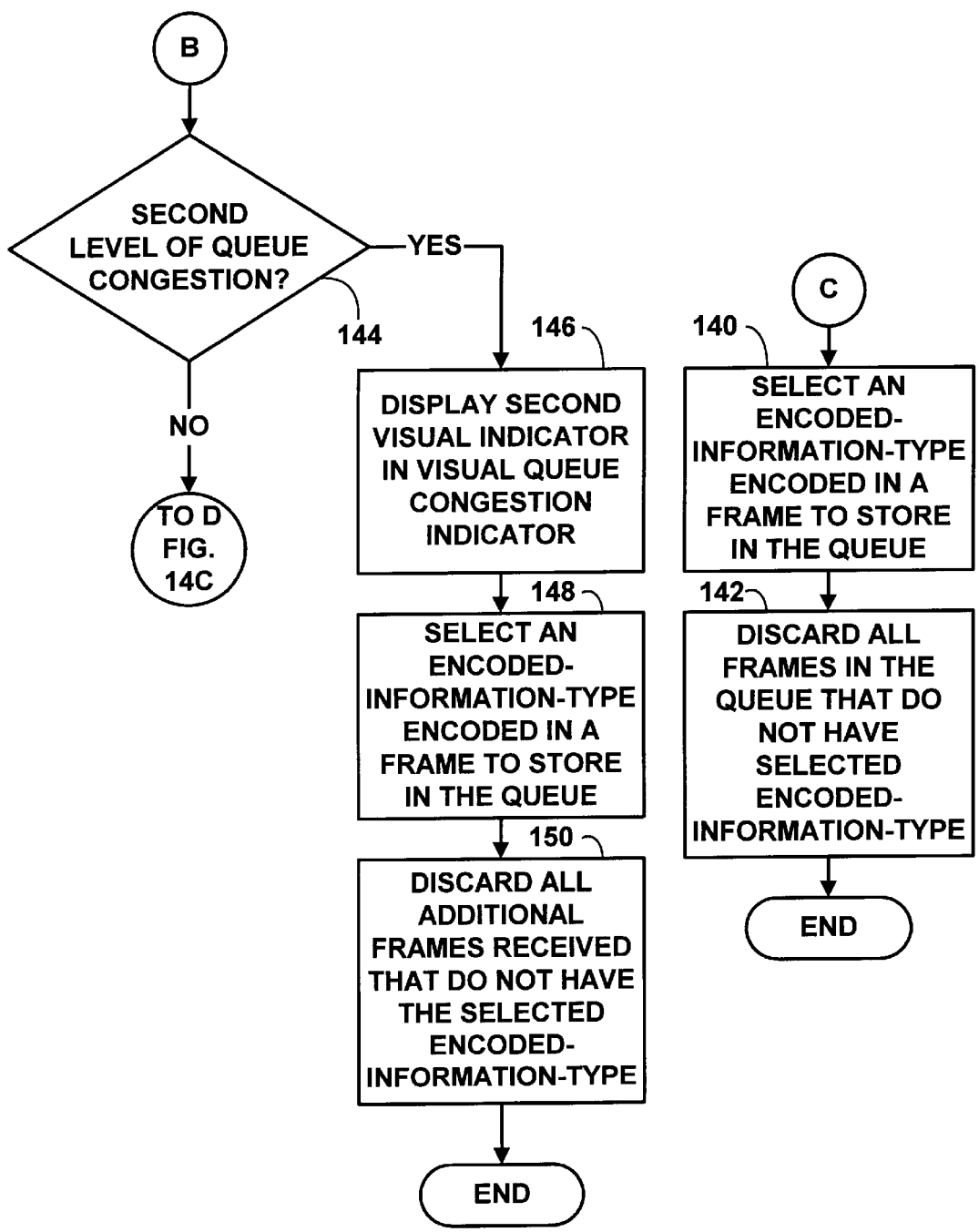
Figure 14C:
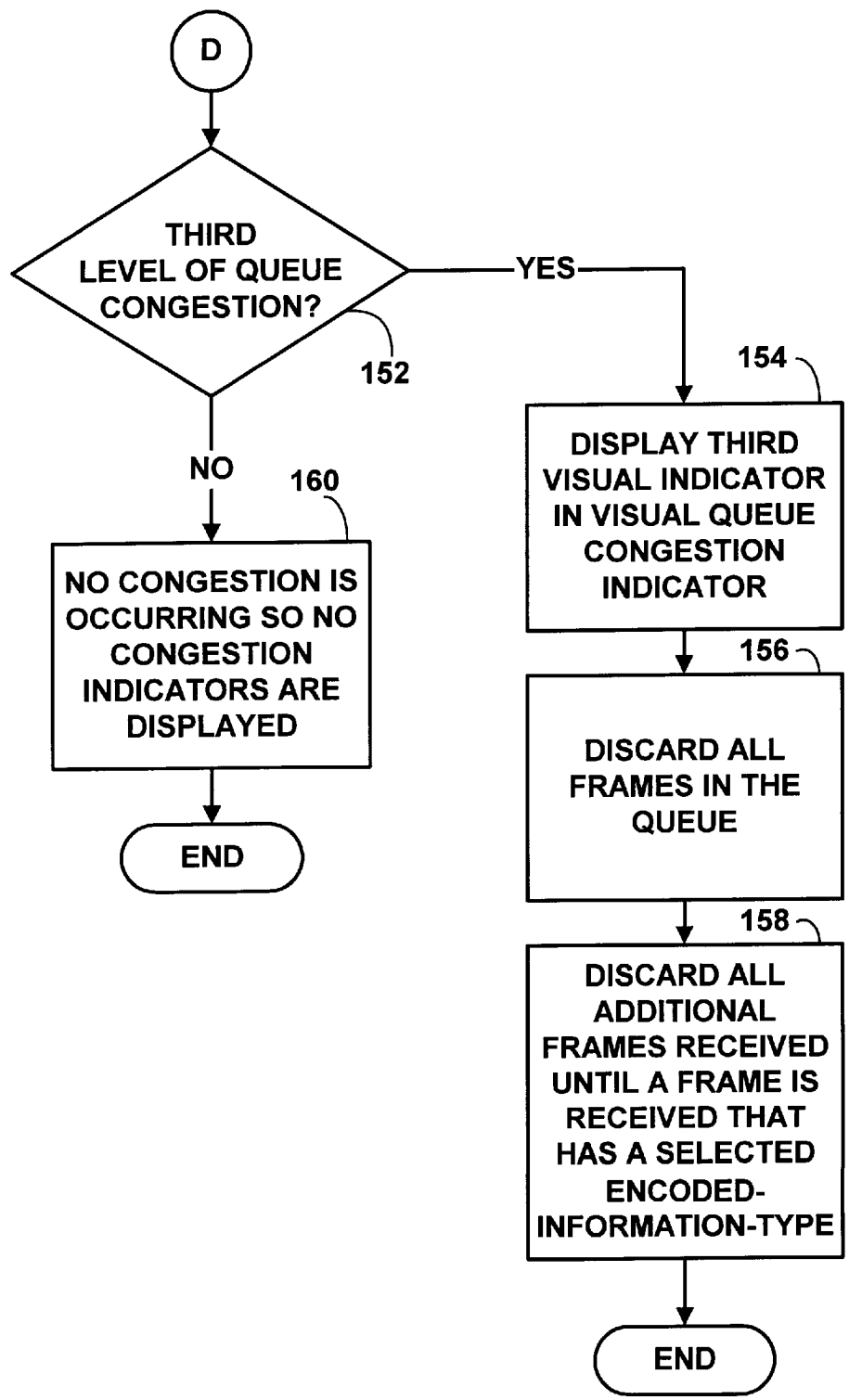

FIGS. 14A, 14B and 14C are a flow diagram illustrating a method 134 for displaying a visual indication of congestion in DVR queue 50 or buffer. At step 136 (FIG. 14A) a test is conducted to determine if a first level of congestion is occurring in DVR queue 50 or buffer. If so, at step 138, first visual indicator 128 is displayed (e.g., with a green color). An encoded-information-type encoded in a data frame is selected at step 140 of FIG. 14A (e.g., H.263 I-frame encoded in a H.225 frame). All frames in DVR queue 50 or buffer that do not have the selected encoded-information-type are discarded at step 142.

If the first level of congestion is not occurring at step 136, at second test is conducted at step 144 (FIG. 14B) to determine if a second level of congestion is occurring. If so, at step 146 second visual indicator is displayed (e.g., with a yellow color). An encoded-information-type encoded in a frame is selected at step 148. All additional frames received are discarded that do not have the selected encoded-information-type at step 150 (e.g., all H.263 P, and PB frames). Frames that do have the selected encoded-information-type are added to DVR queue 50 or buffer. The frames already in DVR queue 50 or buffer are processed as new received frames are being discarded.

If the second level of congestion is not occurring at step 144, a third test is conducted at step 152 (FIG. 14C) to determine if a third level of congestion is occurring. If so, at step 154 third visual indicator 132 is displayed (e.g., with a red color). An encoded-information-type encoded in a frame is selected at step 156. All frames in DVR are discarded in DVR queue 50 or buffer at step 158. All additional frames received are discarded at step 158 until a frame with the selected encoded-information-type is received.

If the third level of congestion is not occurring at step 152, then no congestion indicators are displayed at step 160 indicating no congestion in DVR queue 50 or buffer. Method 134 and visual queue congestion indicator 136 are used in IND 16 to allow a user to visually determine the amount of congestion in DVR queue 50 or a buffer. Method 134 and visual queue congestion indicator 136 are beneficial to indicate congestion in DVR queue 50 or buffer when a first communication link connected to IND 16 has very large bandwidth and a second communication link has a smaller bandwidth (e.g., 10 Mbps LAN communication link and a 28,800 bps serial communication link). Method 134 and visual queue congestion indicator 136 can also be used with other queues or buffers that are not implemented as DVR queue 50.

In one specific embodiment of the present invention, IND 16 (FIG. 12) is implemented in a Total Control Enterprise Network Hub commercially available from 3Com Corporation of Santa Clara, Calif. The Total Control product includes multiple network interface cards connected by a common bus. See "Modem Input/Output Processing Signaling Techniques", U.S. Pat. No. 5,528,595, granted to Dale M. Walsh et al. for a description of the architecture of the Total Control product, which is incorporated by reference herein. For example, LAN interface 106 is a 3Com Ethernet or Token Ring interface card other LAN interface card. Modem interface 110 is a 3Com Quad Modem card (or the equivalent). Computer software server 22 is added to existing software in the Total Control product (such as in the Edgeserver card) to implement method 28 and one or more of methods 52, 66, 76, 92 and 134 described above to accomplish features described herein. However, IND 16 can also be implemented in other devices with other hardware and software configurations and is of course not limited to implementation in a Total Control product or the equivalent.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of adaptively prioritizing between two or more encoded-information-types received over a communication link in a plurality of frames in an internetworking device, the frames including a plurality of data bits, the method comprising the following steps:

receiving a plurality of frames for a first network protocol over a first communication link having a first communication bandwidth, the plurality of frames having one of a plurality of encoded-information-types;

storing the received frames in a delay variance removing queue in a memory in the internetworking device, the delay variance removing queue allowing the internetworking device to compensate for sequencing or timing relationships used in the first network protocol;

translating the frames from the delay variance removing queue into a second network protocol;

determining periodically whether a number of frames arriving on the first network connection exceeds a predetermined queue congestion threshold, and if so, selecting an encoded-information-type encoded in a frame to store in the delay variance removing queue;

discarding received frames that do not have the selected encoded-information-type until enough frames in the delay variance removing queue have been processed so the delay variance removing queue reaches a predetermined length; and sending the translated frames for the second network protocol over a second communication link having a second communication bandwidth, the second communication bandwidth being less than the first communication bandwidth.

2. A computer readable medium having stored therein instructions for causing a central processing unit to execute the method of claim 1.

3. The method of claim 1 wherein the step of discarding received frames includes:

determining a first location in the delay variance removing queue containing a first frame with the selected encoded-information-type;

determining a second location in the delay variance removing queue containing a second frame with the selected encoded-information-type; and discarding other frames in other locations in the delay variance removing queue between the first and second locations, thereby increasing space in the delay variance removing queue.

4. The method of claim 1 wherein the step of discarding received frames includes:

determining a first location in the delay variance removing queue containing a first frame with the selected encoded-information-type; and discarding other frames in locations in the delay variance removing queue prior to the first location, thereby increasing space in the delay variance removing queue.

5. The method of claim 1 wherein the step of discarding received frames includes:

discarding frames that do not have the selected encoded-information-type until X-number of frames have been received or a frame with the selected encoded-information-type is received.

6. The method of claim 1 wherein the step of discarding received frames includes:

sending a first flow control message over the first communication link requesting frames be sent at less than the first communication bandwidth;

setting a timer with a predetermined congestion control value; and upon expiration of the timer, sending a second flow control message over the first communication link requesting frames again be sent at the first communication bandwidth.

7. The method of claim 6 wherein the first and second flow control messages are sent with the H.245 control protocol for multimedia communication.

8. The method of claim 1 wherein the step of discarding received frames includes:

determining a time period when a frame with the selected encoded-information-type is received;

setting a timer with the time period; and discarding frames received until the timer expires or a frame with the selected encoded-information-type is received.

9. The method of claim 1 further comprising:

receiving a selection input with a time period for continuously receiving frames with a new encoded-information-type;

setting a timer with the time period; and discarding frames received that do not have the new encoded-information-type until the time expires.

10. The method of claim 1 wherein the first communication link is communication link to a local area network communication link and the second communication link is a serial line communication link.

11. The method of clam 1 wherein the first network protocol is H.323 and the second network protocol is any of H.320, H.323 over a LAN, H.323 over PPP or H.324.

12. The method of claim 1 wherein the step of selecting an encoded-information-type includes selecting a H.263 I-frame as the encoded-information-type.

13. The method of claim 1 wherein the discarding step includes discarding received frames having an encoded-information-type of any of H.263 P-frames, frames or PB-frames.

14. The method of claim 1 wherein the step of discarding received frames includes:

determining whether a first frame with the selected encoded-information-type is in the delay variance removing queue, and if not, discarding received frames that do not have the selected encoded-information-type until a frame with the selected encoded-information-type is received.

15. The method of claim 1 wherein the first and second communication links have two or more virtual channels for sending and receiving frames and the two or more virtual channels include a first virtual channel for audio information, a second virtual channel for video information and a third channel for data information.

16. The method of claim 1 wherein the plurality of frames received over the communication link include any of H.225 or H.223 frames.

17. The method of claim 1 wherein the delay variance removing queue is a buffer that is used to translate network protocols that do not require timing synchronization with a delay variance removing queue.

18. An internetworking apparatus for translating a plurality of frames received for a first network protocol over a first communication link having a first communication bandwidth, the plurality of frames having one of a plurality of encoded-information-types into a second network protocol sent over a second communication link having a second communication bandwidth, the apparatus comprising:

a delay variance removing queue, for allowing the internetworking device to compensate for sequencing or timing relationships used in a first network protocol;

a translator, for translating frames from the first network protocol stored in the delay variance removing queue into a second network protocol; and a queue congestion threshold for discarding received frames that do have a selected encoded-information-type until enough frames in the delay variance removing queue are processed so the delay variance removing queue reaches a predetermined length.

19. The internetworking apparatus of claim 18 wherein the delay variance removing queue is a buffer that is used to translate network protocols that do not require timing synchronization with a delay variance removing queue.

* * * * *